United States Patent Office 3,510,102
Patented May 5, 1970

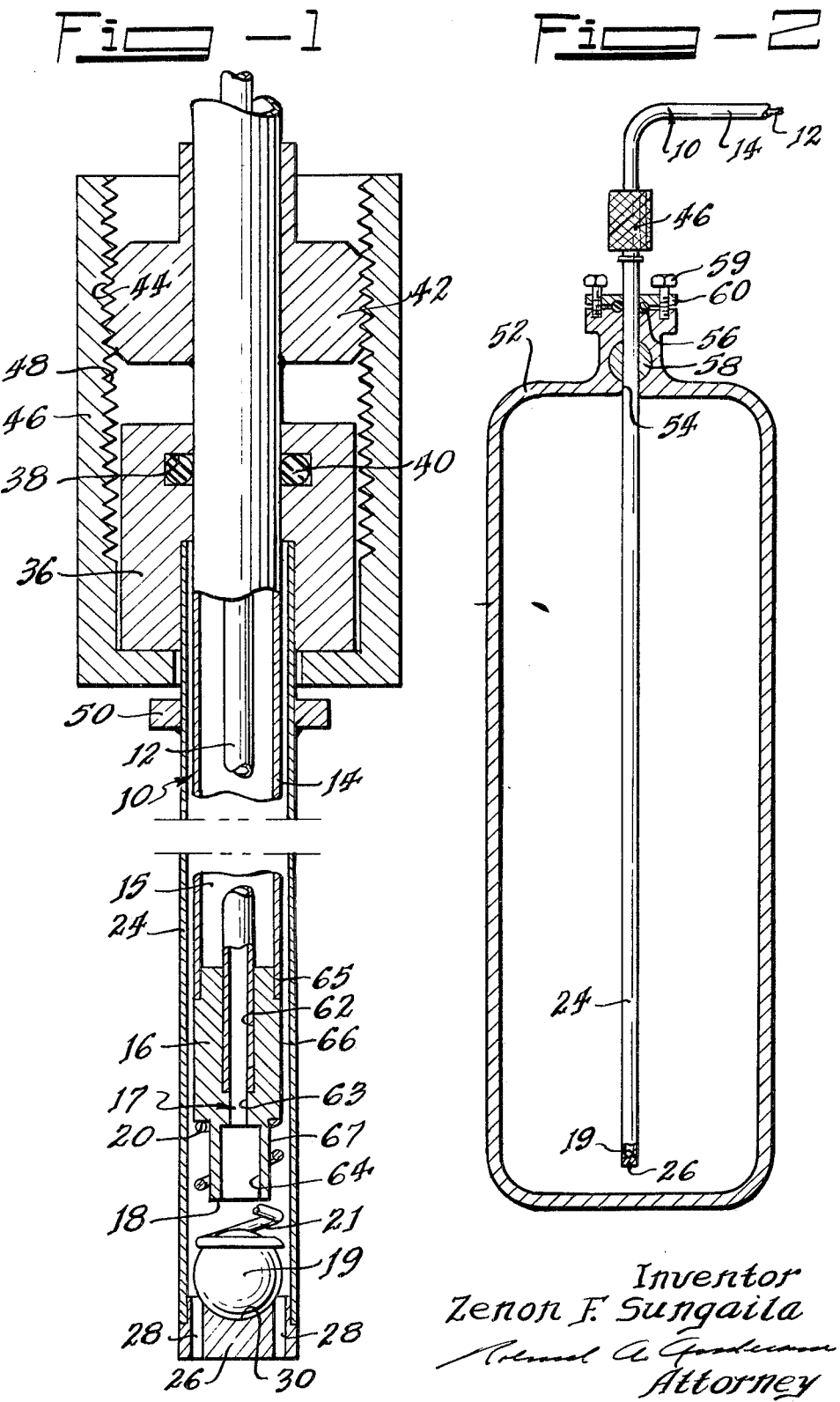

3,510,102
VALVE ASSEMBLY
Zenon F. Sungaila, Chicago, Ill., assignor to the United States of America as represented by the United States Atomic Energy Commission
Filed Aug. 8, 1968, Ser. No. 751,103
Int. Cl. B65d 47/20; F16k 31/14, 31/44
U.S. Cl. 251—278        4 Claims

ABSTRACT OF THE DISCLOSURE

A valve assembly for use with a liquefied-gas container. The assembly enters the container through an opening in the top and has a valve portion proper near the bottom and a control for the valve portion outside the top of the container. The valve assembly serves as an insulated stopper for the container.

CONTRACTUAL ORIGIN OF THE INVENTION

The invention described herein was made in the course of, or under, a contract with the United States Atomic Energy Commission.

BACKGROUND OF THE INVENTION

This invention relates to a valve assembly. More specifically, this invention relates to a valve assembly that is inserted into a liquefied-gas container to remove the gas as a liquid and is retained in said container to act as a stopper to prevent boiloff or loss of the gas.

Heretofore, in order to transfer a liquefied gas from an insulated storage container, it has been necessary to depressurize the container and remove a stopper before a warm transfer line can be inserted into the container to remove the liquefied gas. Upon completion of the transfer, the line must be removed, and a stopper reapplied to the container to prevent further loss of gas. It can readily be seen that each time a transfer of gas must be made there is opportunity for considerable loss of expensive and in some instances relatively rare gases to the atmosphere.

SUMMARY OF THE INVENTION

The present valve assembly comprises a tubular transfer line having a valve seat at one end, a ball engageable with the valve seat, a control tube surrounding the transfer line and retaining in one end the ball near the valve seat, and means acting between the transfer tube and the other end of the control tube to move the transfer tube with respect to the control tube for making the ball engage the valve seat or be spaced from the valve seat. The valve assembly is inserted through the top of a liquefied-gas container, so that the valve seat and ball are near the bottom of the container, and the means for moving the transfer tube is outside the top of the container.

BRIEF DESCRIPTION OF THE DRAWINGS

FIG. 1 is a longitudinal sectional view of the valve assembly of the present invention.

FIG. 2 is a longitudinal sectional view of a container showing the valve inserted therein.

DESCRIPTION OF THE PREFERRED EMBODIMENT

As shown in FIG. 1, an insulated transfer tube 10 is formed of inner and outer tubular walls 12 and 14 radially spaced from one another. Walls 12 and 14 define an annular space 15 to which vacuum is applied. One end of the annular space 15 is closed by a fitting 16 welded to adjacent ends of walls 12 and 14. The other end of space 15 is similarly closed by means not shown.

The fitting 16 has a central longitudinal opening or passageway 17. The end of the fitting 16 away from the walls 12 and 14 constitutes an annular valve seat 18 which is engageable by a ball 19. When the ball engages the valve seat, the ball closes the end of the transfer tube 10 formed by the fitting 16. The transfer tube 10 has an external shoulder 20 which is formed on the fitting 16 and faces in the direction of the end of the transfer tube 10 constituted by the valve seat 18. A coil spring 21, which embraces the portion of the fitting 16 between shoulder 20 and seat 18, acts against the shoulder and the ball 19 to urge the ball off the seat, as shown in FIG. 1.

Transfer tube 10 is surrounded by a control tube 24 one end of which extends beyond fitting 16. This end is enclosed by an end piece 26 having a plurality of passages 28 between the interior and exterior of control tube 24 and a concave recess 30 seating the ball 19. The passages 28 are distributed about the radially outer region of the recess 30.

A retainer 36 is attached by welding in sealed relation to the end of control tube 24 remote from the end piece 26 and has an internal groove 38 containing a sealing ring 40 which is in sliding sealing relation with inner transfer tube 10 and so prevents the escape of gas from between the tubes 10 and 24. An adaptor 42 having an external thread 44 is attached to the outside of transfer tube 10 at a region thereof beyond the control tube 24 and the retainer 36. A cup-shaped collar 46 has in its base an opening through which the control tube 24 freely extends. The retainer 36 lies within the collar and is kept against the inside of the base of the collar under the action of spring 21. The collar 46 has an internal thread 48 engaging the thread 44 on adaptor 42. A retaining ring 50, which is secured to the outside of control tube 24 at a spacing from the retainer 36 somewhat greater than the thickness of the base of the collar 46, is engageable with the outside of the base of collar 46 and so supports the collar when the tubes 10 and 24 are disconnected from one another.

In the position of FIG. 1, the ball 19 is spaced from the seat 18 on the fitting 16 of transfer tube 10. Fluid may pass through the openings 28 in the end piece in the control tube 24 and flow past the ball 19 through the passageway 17 and out through the transfer tube 10. When the valve assembly is to be closed, the collar 46, which is knurled exteriorly, is rotated. The transfer tube 10 and adaptor 42 are held against rotation and, as a result, are moved axially with respect to the control tube 24 as the collar 46 is rotated, by virtue of engagement of thread 44 on adaptor 42 with thread 48 on collar 46. The transfer tube 10 is moved downwardly as viewed in FIG. 1 until the valve seat 18 engages the ball 19. Now fluid can no longer escape past the seat 18 and ball 19 out through the transfer tube 10. Rotation of the collar 46 in one direction produces engagement of the seat 18 with ball 19. Rotation of collar 46 in the opposite direction returns the parts to the position of FIG. 1, in which the seat 18 is spaced from the ball 19.

As shown in FIG. 2, a container 52 has in its top an opening 54 in which are provided an O-ring seal 56 and a ball gate valve 58. Before the assembled tubes 10 and 24 are applied to the container 52, the valve 58 is 90 degrees from the position of FIG. 2 to prevent loss of gas from the container. With the tubes 10 and 24 in the position described in the preceding paragraph, in which ball 19 engages seat 18, the end of the control tube 24 is inserted in the container opening 54 and just through the seal 56. Now the valve 58 is rotated to the position of FIG. 2 and the tubes 10 and 24 are pushed well into the container 52 until the lower ends thereof are adjacent the base of the container. Now screws 59 are tightened to increase the pressure of a ring 60 against the seal 58 and thereby the pressure of seal 58 against control tube 24. It is presumed that, before the present valve assembly was inserted, the container 52 was substantially filled with liquefied gas, such as helium, on top of which there is the same gas in gaseous form under considerable pressure. Liquefied gas is transferred from the container 52 to other smaller containers (not shown) as desired, when the valve assembly is adjusted to space the ball 19 and seat 18 from one another, as shown in FIG. 1.

Since, as previously described, the lower ends of the tubes 10 and 24 are adjacent the base of the container, the valve portion proper of the valve assembly, namely, the seat 18 and the ball 19, is near the base of the container 52 and remains very cold as long as there is liquefied gas in the container. Since the seat 18 and ball 19 stay cold, there is no heat conduction loss resulting in vaporization of the liquefied gas as it flows past the seat and ball. Yet no special heat insulation is provided in the valve assembly for the seat 18 and ball 19. The seat and ball are kept cold without insulation, because they are located at the bottom of the container 52 where they are constantly immersed in liquefied gas. Since no special heat insulation is provided in the construction at the seat 18 and ball 19, they easily fit with the necessary clearance in the control tube 24, which has a relatively small diameter. There is, of course, very little conduction loss as the liquefied gas passes from the container 52 through the insulated transfer line 10. Even though the seat 18 and ball 19 may be warm before the valve assembly is inserted in the container 52, the seat and ball are very rapidly cooled during the insertion as they descend through the liquefied gas in the container. By contrast, the ball 19 and seat 18 would not be cooled at all if they were so positioned in the valve assembly as to remain outside the container. Similarly, if the ball 19 and seat 18 were inserted in the container 52 but stayed near its top, the ball and seat would warm up when the level of the liquefied gas in the container dropped below them.

Although the control tube 24 is relatively small, as stated, and the transfer tube 10 located thereon is necessarily small, the action between the seat 18 and ball 19 in passing liquefied gas or preventing its passage is a good one, because the ball 19 is as large in diameter as the exteriors of the transfer tube 10 and the fitting 16, and the inner edge of the seat 18 which the ball 19 engages is smaller in diameter than the aforesaid exteriors only by twice the radial thickness of the seat and twice the radial thickness of the annular space needed for the spring 21.

The inner wall 12 of the transfer tube 10 is relatively small in diameter so that the radial thickness of the vacuum space 15 between the walls 12 and 14 may be sufficient to insure good insulation of the transfer tube. The opening 17 in the fitting 16 has a portion 62 extending from an inner end and having the same diameter as the exterior of the inner wall 12; a portion 63 extending from the portion 62 and having the same diameter as the interior of the inner wall 12; and a portion 64 extending from portion 63 to the outer end of fitting 16 and having a diameter larger than the portions 62 and 63. The end of the inner wall 12 overlaps the portion 62 of opening 17 and is sealed thereto.

The exterior of the fitting 16 has a region 65 extending from the inner end of the fitting and having the same diameter as the exterior of the outer wall 14; a region 66 extending from the region 65 and having the same diameter as the interior of the outer wall 14; and a region 67 extending from the region 66 and having a diameter more than portion 64 of opening 17 and less than region 66 by an amount to accommodate the coil spring 21. The end of wall 14 overlaps region 65 of the exterior of fitting 16 and is sealed thereto.

The movement of the seat 18 and ball 19 toward and away from one another for closing and opening of the valve assembly is an easy operation, since it is performed exteriorly of the container 52 by turning of the knurled collar 46. This is made possible by the long control tube 24 which extends around the transfer tube 10 from its end piece 26 at the bottom of the container 52 seating the ball 19 to the retainer 36 outside the top of the conainer engaging the collar 46.

It will be understood that the invention is not to be limited to the details given herein but that it may be modified within the scope of the appended claims.

The embodiments of the invention in which an exclusive property or privilege is claimed are defined as follows:

1. An assembly comprising:
 (a) a transfer tube comprising inner and outer walls having a space therebetween to which vacuum is applied, said transfer tube having a seat formed on one end and an external shoulder near but spaced from said one end of the inner tube in facing relation to said one end;
 (b) a ball adapted to engage said seat for closing said one end;
 (c) a coil spring surrounding the region of the transfer and acting against the external shoulder and the ball to urge said ball away from said one end of the transfer tube;
 (d) a control tube surrounding said transfer tube and having a first end and a second end, said first end lying beyond said one end of the transfer tube and containing means for retaining said ball within the transfer tube; and
 (e) means acting between the transfer tube and the second end of the control tube to move one tube longitudinally with respect to the other tube in one direction for seating the ball on said one end of the transfer tube and in the opposite direction for enabling the coil spring to move the ball away from said one end of the transfer tube.

2. The assembly of claim 1 wherein the means acting between the tubes comprises:
 (a) an adaptor having external threads and being attached to said transfer tube beyond the second end of said control tube;
 (b) retaining means attached to said second end of said control tube; and
 (c) a cup-shaped collar surrounding said retaining means and having internal threads engaging said threads on said adaptor, whereby rotation of said collar moves said adaptor.

3. The assembly specified in claim 2, the transfer tube including at its said one end
 (A) a fitting having
  (1) a central longitudinal opening extending therethrough having
   (a) a first portion extending from an inner end of the fitting and having the same diameter as the exterior of the inner wall of the transfer tube, the said first portion overlapping an end of the inner wall and being sealed thereto,
   (b) a second portion extending from the first portion and having the same diameter as the interior of the inner wall of the transfer tube,
   (c) a third portion extending from the second portion to an outer end of the fitting and having a larger diameter than the first portion,
  (2) the exterior of the fitting having
   (a) a first region extending from the inner end and having the same diameter as the inside of the outer wall of the transfer tube, the said first region overlapping an end of the outer wall and being sealed thereto, (b) a second region extending from the first region and having the same diameter as the outside of the outer wall, and (c) a third region extending from the second region to the outer end of the fitting and having a diameter less than the second region and greater than the third portion of the opening, the third region being the region surrounded by the coil spring, the external shoulder against which the coil spring acts being formed between the second and third regions, the seat adapted to be engaged by the ball being defined internally by the third portion of the opening and externally by the third region of the exterior of the fitting, the diameter of the ball and the outer diameter of the coil spring being about equal to the diameter of the second region of the exterior of the fitting;

(B) the means contained in the first end of the control tube for retaining the ball within the control tube comprising an end piece attached to said first end and having a concave recess seating the ball and a plurality of passages distributed about the radially outer region of the recess.

4. The assembly specified in claim 2 and further comprising:

(a) a container having an opening in one end; the transfer and control tubes being located in the opening in the container so that the ball, the spring, the said one end of the transfer tube, and the first end of the control tube lie within the container adjacent the end thereof opposite the said one end, and the retaining means, the collar, and the second end of the control tube lie outside the container;

(b) a first seal located between the control tube and the opening in said container; and (c) a second seal acting between the transfer and control tubes.

References Cited

UNITED STATES PATENTS

| 1,229,276 | 6/1917 | Jimerson | 251—347 X |
| 2,192,945 | 3/1940 | Toney | 251—354 X |
| 2,785,838 | 3/1957 | Mayer | 222—402.25 X |
| 3,431,744 | 3/1969 | Veilex et al. | 62—55 |

WILLIAM F. O'DEA, Primary Examiner

D. R. MATTHEWS, Assistant Examiner

U.S. Cl. X.R.

62—55; 137—375, 577, 590; 222—402.25; 251—340